(No Model.)
J. E. MASON.
PAN LIFTER.
No. 417,061. Patented Dec. 10, 1889.
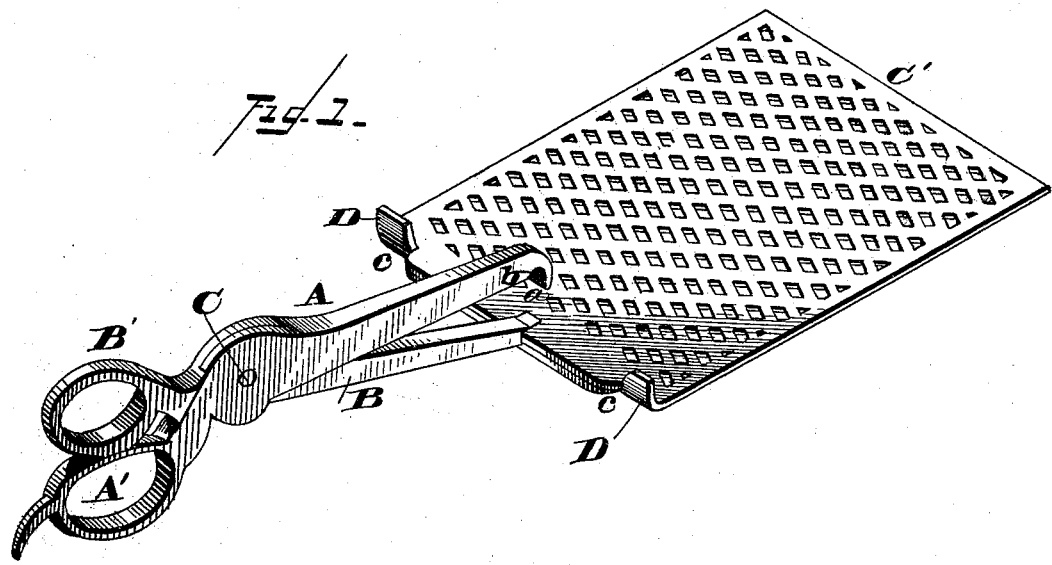
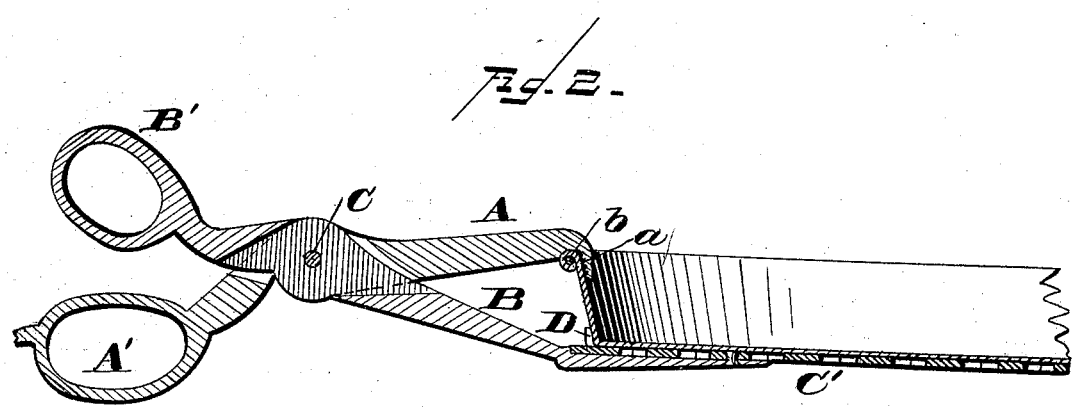
WITNESSES
F. L. Ourand
C. T. Chisholm
INVENTOR
John Edmunds Mason
by Louis Bagger & Co.
Attorneys
N. PETERS, Photo-Lithographer, Washington, D. C.

UNITED STATES PATENT OFFICE.

JOHN EDMUNDS MASON, OF PETERSBURG, VIRGINIA.

PAN-LIFTER.

SPECIFICATION forming part of Letters Patent No. 417,061, dated December 10, 1889.

Application filed July 12, 1889. Serial No. 317,347. (No model.)

*To all whom it may concern:*

Be it known that I, JOHN EDMUNDS MASON, a citizen of the United States, and a resident of Petersburg, in the county of Dinwiddie and State of Virginia, have invented certain new and useful Improvements in Pan-Lifters; and I do hereby declare that the following is a full, clear, and exact description of the invention, which will enable others skilled in the art to which it appertains to make and use the same.

Figure 1 is a perspective view of my pan-lifter or pie-plate holder; and Fig. 2 is a longitudinal sectional view of the same, illustrating the manner of using it.

Like letters of reference denote corresponding parts in both the figures.

My invention relates to that class of culinary utensils known as "pan-lifters" or "pie-plate holders," and has for its object to produce a simple and inexpensive implement of that class which shall be easy to manipulate as well as convenient and safe in its application.

With these objects in view my invention consists in the improved construction and combination of parts of the utensil or device, which will be hereinafter more fully described and claimed.

Reference being had to the accompanying drawings, the letter A designates the upper and B the lower arm or jaw of the handle, which are pivoted together at C like the blades of a pair of shears and provided with the finger-pieces A' and B'. To the outer end of the lower jaw B is securely fastened (by riveting or other suitable means) a flat plate C', preferably of rectangular shape, and which may be either solid or made of open-work, as shown in the drawings, the last-named construction making the plate both lighter in weight and more ornamental in appearance than if made solid. The rear edge of this plate, where it is fastened upon the jaw or arm B, is cut out to form two notches c c, and the ends or corners thus formed on opposite sides are set up at right angles to the body of the plate to form the stops D D. The upper jaw A is bent at (approximately) a right angle at its outer end to form a downwardly-projecting lip a, which is roughened or serrated on its inner side. A small notch or recess b is also formed in this part of the jaw contiguous or adjacent to the downwardly-bent lip a, which, in connection with the serrated lip, serves to give the jaw A a firm grip or bite over the upper rim of the pan or pie-plate in using the utensil, as will be seen by reference to Fig. 2 of the drawings. From this figure it will be seen that the device holds the pan or plate by clamping it between the flat bottom and the top edge of the rim, so that there is no danger of breaking or marring the top or crust of the bread or other material contained in the pan. It will further be observed that the jaws or handles whereby the device is held and manipulated when in use are of sufficient length to prevent burning of the hand by too close proximity to the hot pan which is to be lifted.

I am aware that utensils of the same type and for the same purpose have been made before, comprising a flat disk or plate at the outer end of an arm or handle of suitable length, said handle being provided with a pivoted latch or keeper operated by a thumb-piece and adapted to clamp the side of the pan or plate between its outer end and the downwardly-bent shank of the handle, and this construction I do not claim; but

What I claim as new, and desire to secure by Letters Patent of the United States, is—

As an improved article of manufacture, the herein-described culinary utensil or pan-lifter, comprising the arm or jaw B B', having plate C', provided with the stops D D, integral with the plate, in combination with the pivoted arm or jaw A A', having the downwardly-bent serrated lip a and notch b, substantially as and for the purpose shown and set forth.

In testimony that I claim the foregoing as my own I have hereunto affixed my signature in presence of two witnesses.

JOHN EDMUNDS MASON.

Witnesses:
LOUIS BAGGER,
AUGUST PETERSON.